(12) United States Patent
Niewiadomski et al.

(10) Patent No.: US 11,884,263 B2
(45) Date of Patent: Jan. 30, 2024

(54) VEHICLE PARKING CONTROL

(71) Applicant: Ford Global Technologies, LLC, Dearborn, MI (US)

(72) Inventors: Luke Niewiadomski, Dearborn, MI (US); Lihui Chen, Rochester, MI (US); Li Xu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 17/002,854

(22) Filed: Aug. 26, 2020

(65) Prior Publication Data

US 2022/0063598 A1 Mar. 3, 2022

(51) Int. Cl.
| | |
|---|---|
| *B60W 30/06* | (2006.01) |
| *G08G 1/14* | (2006.01) |
| *B60W 10/04* | (2006.01) |
| *B60W 10/18* | (2012.01) |
| *B60W 60/00* | (2020.01) |
| *B60W 10/20* | (2006.01) |

(52) U.S. Cl.
CPC ............ *B60W 30/06* (2013.01); *B60W 10/04* (2013.01); *B60W 10/18* (2013.01); *B60W 10/20* (2013.01); *B60W 60/001* (2020.02); *G08G 1/143* (2013.01); *B60W 2420/42* (2013.01); *B60W 2420/52* (2013.01); *B60W 2420/54* (2013.01)

(58) Field of Classification Search
None
See application file for complete search history.

(56) References Cited

U.S. PATENT DOCUMENTS

| | | | |
|---|---|---|---|
| 6,680,689 B1 * | 1/2004 | Zoratti | |
| 9,969,386 B1 * | 5/2018 | Wang | B62D 15/0285 |
| 2010/0156672 A1 | 6/2010 | Yoo et al. | |
| 2017/0008517 A1 * | 1/2017 | Himi | B60W 50/14 |
| 2017/0249840 A1 * | 8/2017 | Singh | G08G 1/168 |
| 2018/0056989 A1 * | 3/2018 | Donald | B60R 25/25 |
| 2018/0065665 A1 | 3/2018 | Urhahne | |
| 2018/0122245 A1 | 5/2018 | Penilla et al. | |
| 2018/0362024 A1 | 12/2018 | Ernesti et al. | |
| 2019/0375401 A1 * | 12/2019 | Shimizu | B60W 30/09 |
| 2020/0079360 A1 * | 3/2020 | Tsujino | B60W 30/06 |
| 2020/0152059 A1 * | 5/2020 | Cohen | G01C 21/3691 |

(Continued)

FOREIGN PATENT DOCUMENTS

| | | |
|---|---|---|
| EP | 3333049 A1 | 6/2018 |
| KR | 101463845 B1 * | 11/2014 |
| WO | 2019135032 A1 | 7/2019 |

*Primary Examiner* — Hunter B Lonsberry
*Assistant Examiner* — Paysun Wu
(74) *Attorney, Agent, or Firm* — Frank A. MacKenzie; Bejin Bieneman PLC

(57) ABSTRACT

A computer includes a processor and a memory storing instructions executable by the processor to actuate movement of a vehicle at a first speed, identify a potentially available parking space in a vehicle direction of travel based on data received from at least one camera, then reduce a speed of the vehicle to a second speed that is less than the first speed while receiving data from at least one proximity sensor about the parking space, and actuate movement of the vehicle to a parking position in the parking space upon determining that the parking space is available based on the data from the at least one proximity sensor.

17 Claims, 7 Drawing Sheets

(56) References Cited

U.S. PATENT DOCUMENTS

| | | | |
|---|---|---|---|
| 2020/0294310 A1* | 9/2020 | Lee | G06V 10/82 |
| 2021/0146836 A1* | 5/2021 | Lee | H04N 5/23238 |
| 2021/0248753 A1* | 8/2021 | Kaneko | G06T 7/13 |
| 2021/0253091 A1* | 8/2021 | Bonandar | |
| 2022/0097685 A1* | 3/2022 | Von Eichhorn | B62D 15/0285 |

* cited by examiner

VEHICLE PARKING CONTROL

BACKGROUND

In an autonomous vehicle, a vehicle computer is programmed to operate the vehicle independently of the intervention of a human driver, completely or to a lesser degree. The vehicle computer may be programmed to operate the propulsion, braking system, steering system, and/or other vehicle systems. Autonomous operation means the computer controls the propulsion, braking system, and steering system without input from a human driver; semi-autonomous operation means the computer controls one or two of the propulsion, braking system, and steering system and a human driver controls the remainder; and nonautonomous operation means a human driver controls the propulsion, braking system, and steering system.

In the context of locating and parking in a parking space in a parking lot, autonomous vehicles or semi-autonomous vehicle can use proximity sensors to verify that a parking space is available, but doing so necessitates traveling through the parking lot at a significantly slower speed than a human-operated vehicle, which is inefficient both for a host vehicle looking for a parking space and also other vehicles in a parking area around the host vehicle.

DETAILED DESCRIPTION

Figure 1:
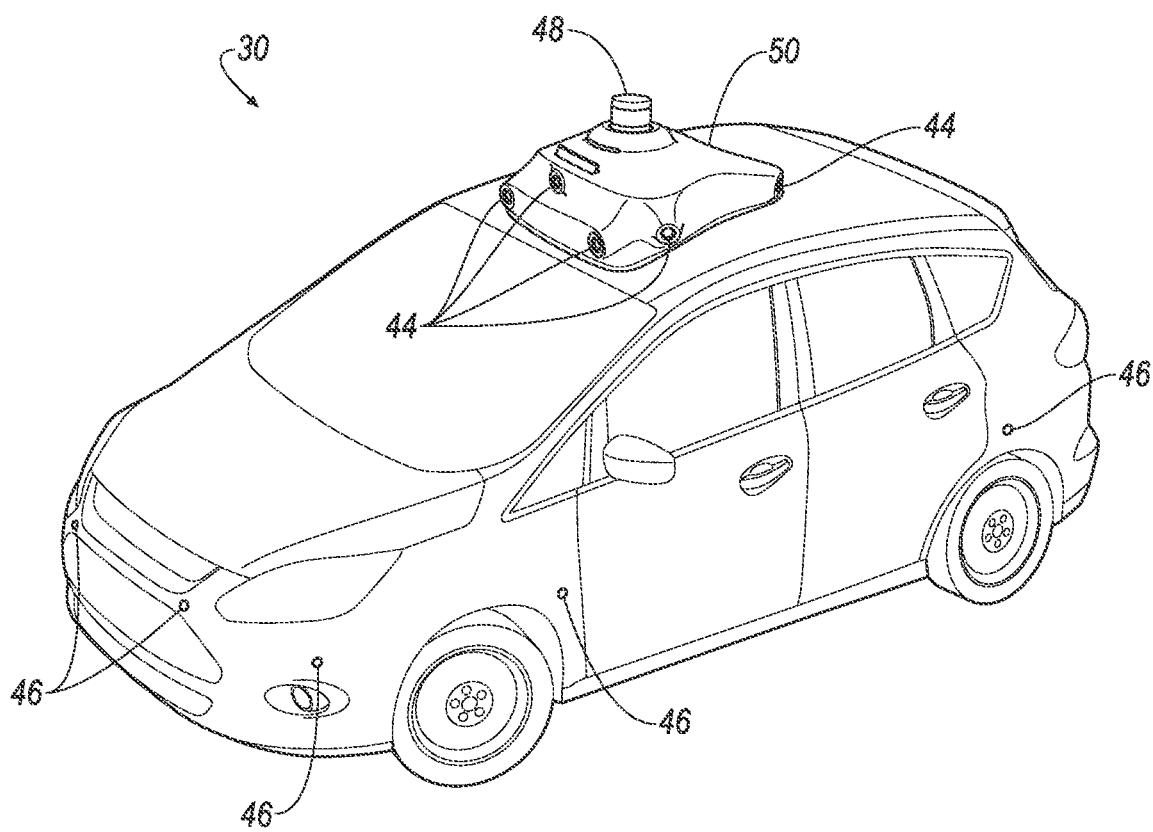
FIG. 1 is a perspective view of an example vehicle.

The improved vehicle control system described herein provides for the vehicle to autonomously locate and park in a parking space while still performing adequate checks for obstacles, prohibitions against parking, etc., and improves the efficiency of the parking process, including the consumption of sensing, communication, and processing resources in the vehicle. The vehicle can identify a potentially available parking space and then control vehicle operations to increase efficiency of locating and/or utilizing a parking space, i.e., the vehicle can travel more slowly while using proximity sensors to verify that the parking space is free of obstacles, and the autonomous vehicle can travel at a relatively faster speed when the vehicle has not yet detected an available parking space. Moreover, systems and methods disclosed herein address the problems of performing parking operations in vehicle equipped with sensors that operate more quickly and/or efficiently but provide a less rich data set than sensors that a vehicle may carry for fully autonomous operations. For example, a vehicle as disclosed herein can perform techniques described below using a forward-facing camera and proximity sensors, and without a LIDAR sensor or even without as many cameras as are typically used for autonomous vehicles.

A computer includes a processor and a memory storing instructions executable by the processor to actuate movement of a vehicle at a first speed, identify a potentially available parking space in a vehicle direction of travel based on data received from at least one camera, then reduce a speed of the vehicle to a second speed that is less than the first speed while receiving data from at least one proximity sensor about the parking space, and actuate movement of the vehicle to a parking position in the parking space upon determining that the parking space is available based on the data from the at least one proximity sensor.

Identifying the potentially available parking space may include receiving image data from the at least one camera, and identifying the potentially available parking space may include applying criteria for shape and pixel area to regions of the image data.

The at least one proximity sensor may include a plurality of radar or ultrasonic sensors mounted below a beltline of the vehicle. Determining that the parking space is available may include determining that the parking space is free of obstacles based on the data from the radar or ultrasonic sensors.

Determining that the parking space is available may further include determining that the parking space is free of markings indicating that parking is prohibited based on data from the at least one camera mounted to the vehicle.

The instructions may further include to select one of actuating movement of the vehicle forward into the parking space or actuating movement of the vehicle backward into the parking space based on a regulation applying to a parking area including the parking space.

The instructions may further include to select one of actuating movement of the vehicle forward into the parking space or actuating movement of the vehicle backward into the parking space based on a selection by an operator of the vehicle.

The instructions may further include to actuate movement of the vehicle forward into the parking space after reducing speed upon determining that a second vehicle is behind the vehicle, and to actuate movement of the vehicle backward into the parking space after reducing speed upon determining that no vehicles are behind the vehicle.

The instructions may further include to actuate movement of the vehicle forward at least partially past the parking space to a stop position at the second speed while receiving the data from the at least one proximity sensor about the parking space, and actuate movement of the vehicle backward from the stop position to the parking position upon determining that the parking space is available based on the data from the at least one proximity sensor. The instructions may further include to resume actuating movement of the vehicle forward at the first speed before reaching the stop position upon determining that the parking space is unavailable based on the data from the at least one proximity sensor.

The instructions may further include to actuate movement of the vehicle forward into the parking space at the second speed while receiving the data from the at least one proximity sensor about the parking space, and stop movement of the vehicle at the parking position upon determining that the parking space is available based on the data from the at least one proximity sensor. The instructions may further include to stop movement of the vehicle short of the parking position upon detecting an obstacle in the parking space or upon detecting markings indicating that parking is prohibited, and then actuate movement of the vehicle backward out of the parking space.

The instructions may further include to turn off the vehicle upon reaching the parking position.

A vehicle includes a vehicle body a propulsion attached to the vehicle body, a braking system attached to the vehicle body, a steering system attached to the vehicle body at least one proximity sensor mounted to the vehicle body, and a computer communicatively coupled to the propulsion, the braking system, the steering system, and the at least one proximity sensor. The computer is programmed to instruct the propulsion to move the vehicle at a first speed, identify a potentially available parking space in a vehicle direction of travel, then instruct at least one of the propulsion or the braking system to reduce a speed of the vehicle to a second speed that is less than the first speed while receiving data from the at least one proximity sensor about the parking space, and instruct at least one of the propulsion, the braking system, or the steering system to move the vehicle to a parking position in the parking space upon determining that the parking space is available based on the data from the at least one proximity sensor.

The vehicle may further include at least one camera mounted to the vehicle body facing forward and communicatively coupled to the computer, and identifying the potentially available parking space may include receiving image data from the at least one camera.

The at least one proximity sensor may include a plurality of radar or ultrasonic sensors mounted below a beltline of the vehicle body. At least one of the plurality of radar or ultrasonic sensors may be directed sideways.

With reference to the Figures, a vehicle 30 includes a vehicle body 32, a propulsion 34 attached to the vehicle body 32, a braking system 36 attached to the vehicle body 32, a steering system 38 attached to the vehicle body 32, at least one sensor 40 mounted to the vehicle body 32, and a computer 42 communicatively coupled to the propulsion 34, the steering system 38, the braking system 36, and the at least one sensor 40. The computer 42 is programmed to instruct the propulsion 34 to move the vehicle 30 at a first speed; identify a potentially available parking space 110 in a vehicle direction of travel F; then instruct at least one of the propulsion 34 or the braking system 36 to reduce a speed of the vehicle 30 to a second speed that is less than the first speed while receiving data from the sensor 40 about the parking space 110; and instruct at least one of the propulsion 34, the braking system 36, or the steering system 38 to move the vehicle 30 to a parking position $P_p$ in the parking space 110 upon determining that the parking space 110 is available based on the data from the at least one sensor 40.

With reference to FIG. 1, the vehicle 30 may be any passenger or commercial automobile such as a car, a truck, a sport utility vehicle, a crossover, a van, a minivan, a taxi, a bus, etc.

The vehicle 30 is an autonomous vehicle. The computer 42 can be programmed to operate the vehicle 30 independently of the intervention of a human driver, completely or to a lesser degree. The computer 42 may be programmed to operate the propulsion 34, braking system 36, steering system 38, and/or other vehicle systems. For the purposes of this disclosure, autonomous operation means the computer 42 controls the propulsion 34, braking system 36, and steering system 38 without input from a human driver; semi-autonomous operation means the computer 42 controls one or two of the propulsion 34, braking system 36, and steering system 38 and a human driver controls the remainder; and nonautonomous operation means a human driver controls the propulsion 34, braking system 36, and steering system 38. The vehicle 30 can be conditionally autonomous, i.e., autonomous under certain circumstances and semi-autonomous or nonautonomous otherwise; for example, the vehicle 30 can operate autonomously in a parking lot 100 and only semi-autonomously or nonautonomously in at least one other context, e.g., most or all other contexts.

The vehicle 30 includes the vehicle body 32. The vehicle may be of a unibody construction, in which a frame and the vehicle body 32 of the vehicle 30 are a single component. The vehicle 30 may, alternatively, be of a body-on-frame construction, in which the frame supports the vehicle body 32 that is a separate component from the frame. The frame and vehicle body 32 may be formed of any suitable material, for example, steel, aluminum, etc.

Figure 2:
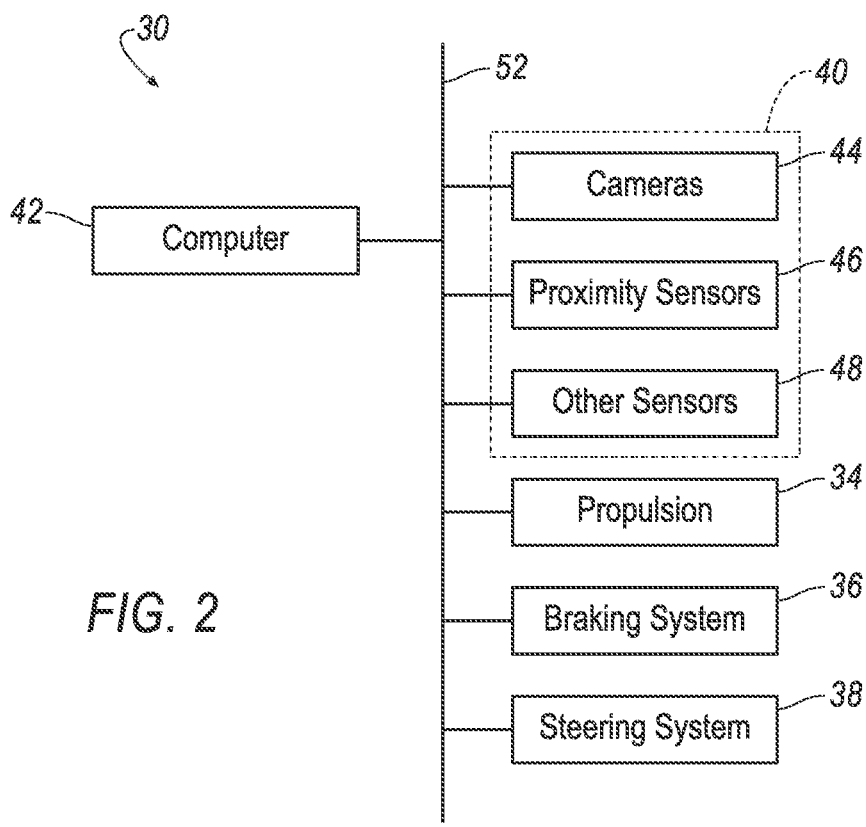
FIG. 2 is a block diagram of the vehicle.

With reference to FIGS. 1 and 2, the sensors 40 include cameras 44, proximity sensors 46, and other sensors 48.

The cameras 44 are mounted to and fixed relative to the vehicle body 32. For example, the cameras 44 can be held and shielded by a housing 50 mounted to a roof of the vehicle body 32. Alternatively or additionally, the cameras 44 can be elsewhere mounted to the vehicle body 32. The cameras 44 typically include cameras aimed forward, sideways, and rearward with respect to the body 32.

The cameras 44 can detect electromagnetic radiation in some range of wavelengths. For example, the cameras 44 may detect visible light, infrared radiation, ultraviolet light, or some range of wavelengths including visible, infrared, and/or ultraviolet light. For another example, the cameras 44 may be a time-of-flight (TOF) cameras, which include a modulated light source for illuminating the environment and detect both reflected light from the modulated light source and ambient light to sense reflectivity amplitudes and distances to the scene.

The proximity sensors 46 are mounted to and fixed relative to the vehicle body 32. For example, the proximity sensors 46 are mounted to the vehicle body 32 below a beltline of the vehicle 30. For the purposes of this disclosure, a "beltline" is a line representing a bottom edge of glass panels of the vehicle 30, e.g., windshield, side windows, and rear window. The proximity sensors 46 include proximity sensors aimed forward, sideways, and rearward.

The proximity sensors 46 can determine a distance to an obstacle in the environment of the vehicle 30 by emitting a pulse and determining a duration of time for the pulse to reflect off of the environment and return to the proximity sensor 46. For example, the proximity sensors 46 can be radar sensors, which emit radio waves, or ultrasonic sensors, which emit ultrasonic sound waves.

The other sensors 48 may provide data about operation of the vehicle 30, for example, wheel speed, wheel orientation, and engine and transmission data (e.g., temperature, fuel consumption, etc.). The other sensors 48 may detect the location and/or orientation of the vehicle 30. For example, the other sensors 48 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The other sensors 48 may detect the external world, e.g., objects and/or characteristics of surroundings of the vehicle 30, such as other vehicles 120, road lane markings, traffic lights and/or signs, pedestrians, etc. For example, the other sensors 48 may include scanning laser range finders and light detection and ranging (LIDAR) devices.

With reference to FIG. 2, the computer 42 is a microprocessor-based computing device, e.g., an electronic controller or the like. The computer 42 includes a processor, a memory, etc. The memory of the computer 42 includes media for storing instructions executable by the processor as well as for electronically storing data and/or databases.

The computer 42 may transmit and receive data through a communications network 52 such as a controller area network (CAN) bus, Ethernet, WiFi, Local Interconnect Network (LIN), onboard diagnostics connector (OBD-II), and/or by any other wired or wireless communications network. The computer 42 may be communicatively coupled to the propulsion 34, the braking system 36, the steering system 38, the sensors 40, and other components via the communications network 52.

The propulsion 34 of the vehicle 30 generates energy and translates the energy into motion of the vehicle 30. The propulsion 34 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 34 can include an electronic control unit (ECU) or the like that is in communication with and receives input from the computer 42 and/or a human driver. The human driver may control the propulsion 34 via, e.g., an accelerator pedal and/or a gear-shift lever.

The braking system 36 is typically a conventional vehicle braking subsystem and resists the motion of the vehicle 30 to thereby slow and/or stop the vehicle 30. The braking system 36 may include friction brakes such as disc brakes, drum brakes, band brakes, etc.; regenerative brakes; any other suitable type of brakes; or a combination. The braking system 36 can include an electronic control unit (ECU) or the like that is in communication with and receives input from the computer 42 and/or a human driver. The human driver may control the brake system via, e.g., a brake pedal.

The steering system 38 is typically a conventional vehicle steering subsystem and controls the turning of the wheels. The steering system 38 may be a rack-and-pinion system with electric power-assisted steering, a steer-by-wire system, as both are known, or any other suitable system. The steering system 38 can include an electronic control unit (ECU) or the like that is in communication with and receives input from the computer 42 and/or a human driver. The human driver may control the steering system 38 via, e.g., a steering wheel.

Figure 3:
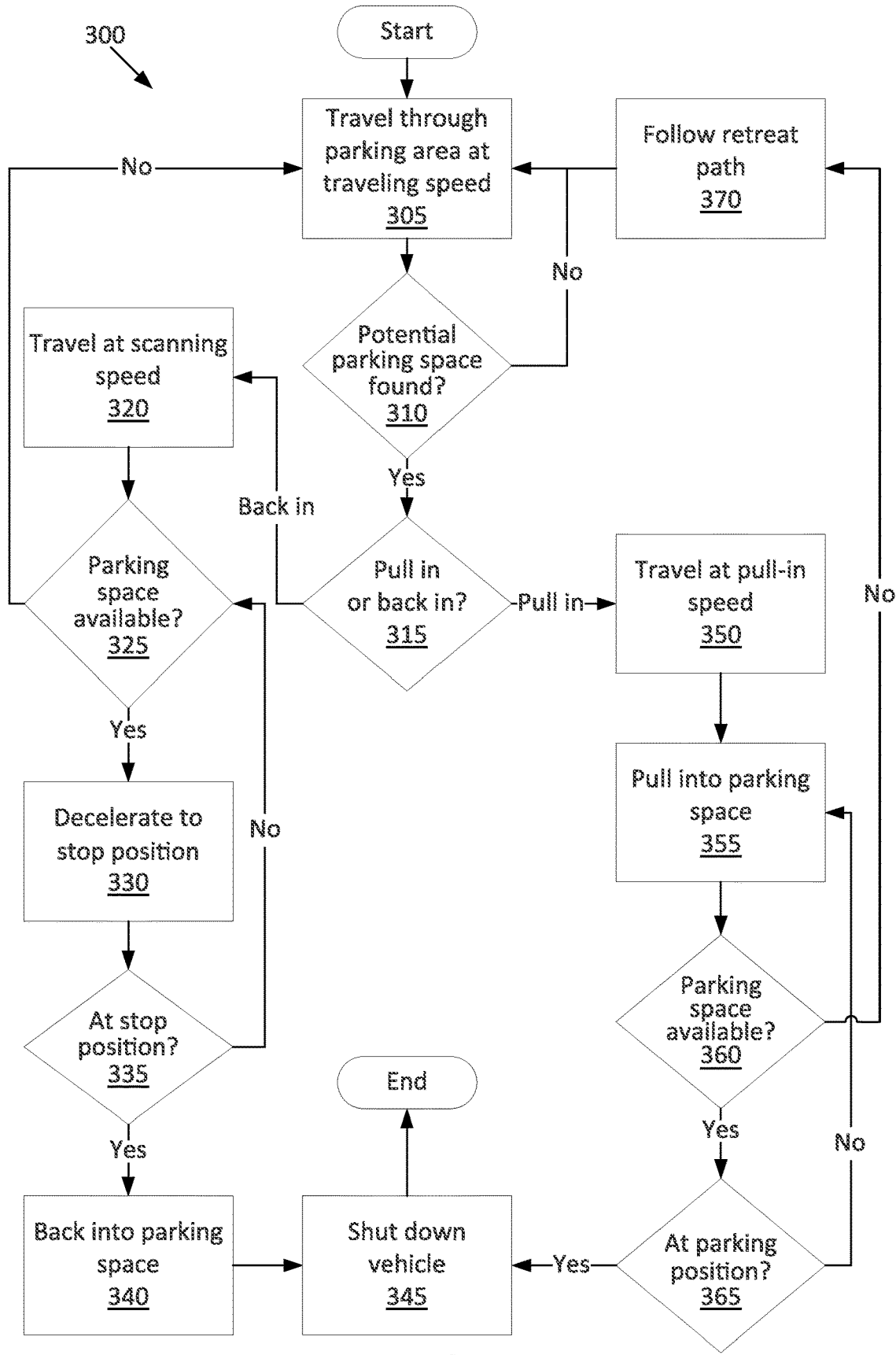
FIG. 3 is a process flow diagram of an example process for parking the vehicle in a parking space.

FIG. 3 is a process flow diagram illustrating an exemplary process 300 for parking the vehicle 30 in a parking space 110. The memory of the computer 42 stores executable instructions for performing the steps of the process 300. As a general overview of the process 300, the computer 42 instructs the vehicle 30 to travel through a parking lot 100 at a first speed, i.e., a traveling speed; identify a potentially available parking space 110 in the direction of travel F of the vehicle 30, i.e., forward of the vehicle 30, using data from the cameras 44 that face forward; then reduce a speed of the vehicle 30 to a second speed less than the traveling speed while receiving data from the proximity sensors 46 about the parking space 110; and move the vehicle 30 to a parking position $P_p$ in the parking space 110 upon determining that the parking space 110 is available based on the data from the proximity sensors 46 and the cameras 44. The computer 42 also decides whether to pull into or back into the parking space 110. The second speed can be different depending on whether the vehicle 30 is pulling into or backing into the parking space 110. If the vehicle 30 backs in, the second speed is a scanning speed, and the vehicle 30 travels forward at least partially past the parking space 110 at the scanning speed to a stop position $P_s$ while receiving data from the sensors 40, and then travels in reverse from the stop position $P_s$ to the parking position $P_p$ at the scanning speed or at a different speed. If the vehicle 30 pulls in, the second speed is a pull-in speed, and the vehicle 30 travels forward toward the parking position $P_p$ at the pull-in speed while receiving data from the sensors 40.

The computer 42 is substantially continuously receiving data from the sensors 40 throughout the process 300 via the communications network 52. The data from the cameras 44 are image data. The image data are a sequence of image frames of the fields of view of the respective cameras 44. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the camera 44 at the time that the image frame was recorded, can be specified in pixel dimensions or coordinates, e.g., an ordered pair of pixel distances, such as a number of pixels from a top edge and a number of pixels from a left edge of the field of view. The data from the proximity sensors 46 is a sequence of distances from the respective proximity sensor 46.

Figure 4:
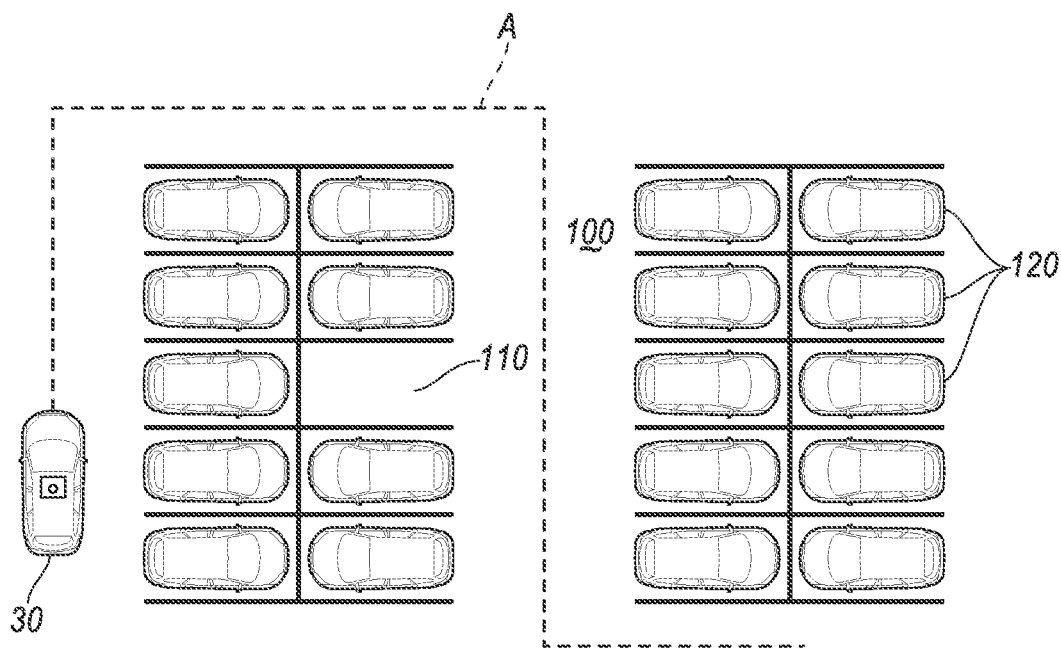
FIG. 4 is a diagram of the vehicle in a parking area.

The process 300 begins in a block 305, in which the computer 42 instructs the propulsion 34, the braking system 36, and the steering system 38 to actuate movement of the vehicle 30 through the parking lot 100 along a search path A, as shown in FIG. 4. The computer 42 can generate a search path A that covers all of the aisles along which parking spaces 110 are located in the parking lot 100. The propulsion 34 moves the vehicle 30 at the travel speed along the search path A. The travel speed is chosen to be sufficiently slow for responding to other vehicles 120, pedestrians, or obstacles in the parking lot 100 based on the processing speed for the sensors 40, e.g., a speed permitting the vehicle 30 to stop within the same distance as an attentive human driver proceeding at a typical speed for a parking lot, and sufficiently fast to avoid undue impatience by occupants of the vehicle 30. The travel speed can be a specified speed stored in the memory of the computer 42.

Figure 5A:
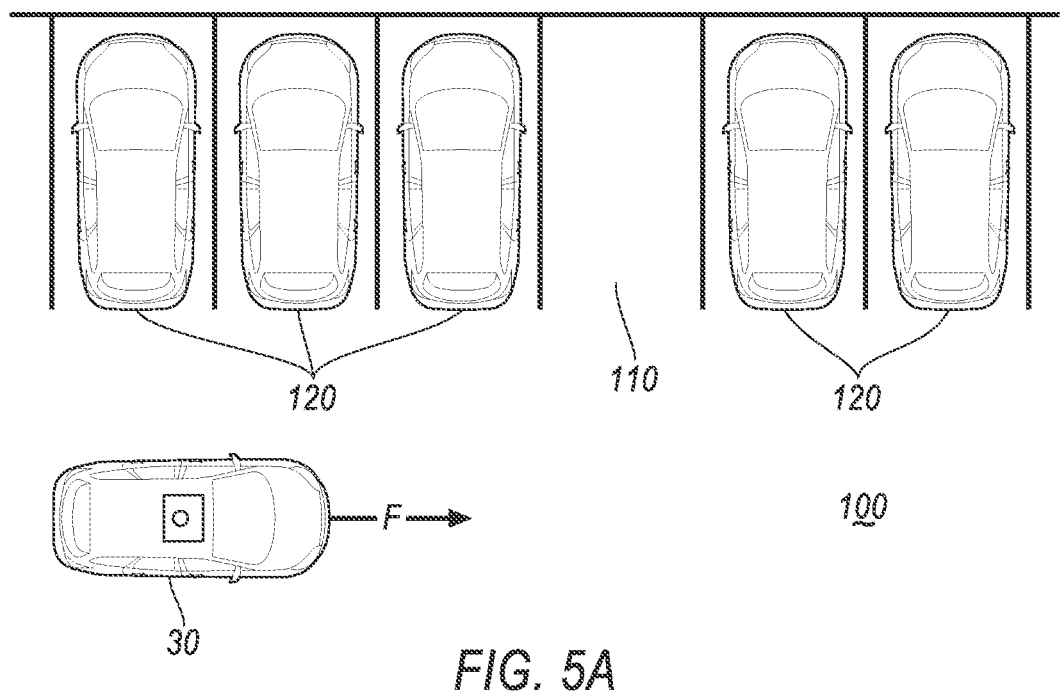
FIG. 5A is a diagram of the vehicle before reaching an available parking space.
Figure 6:
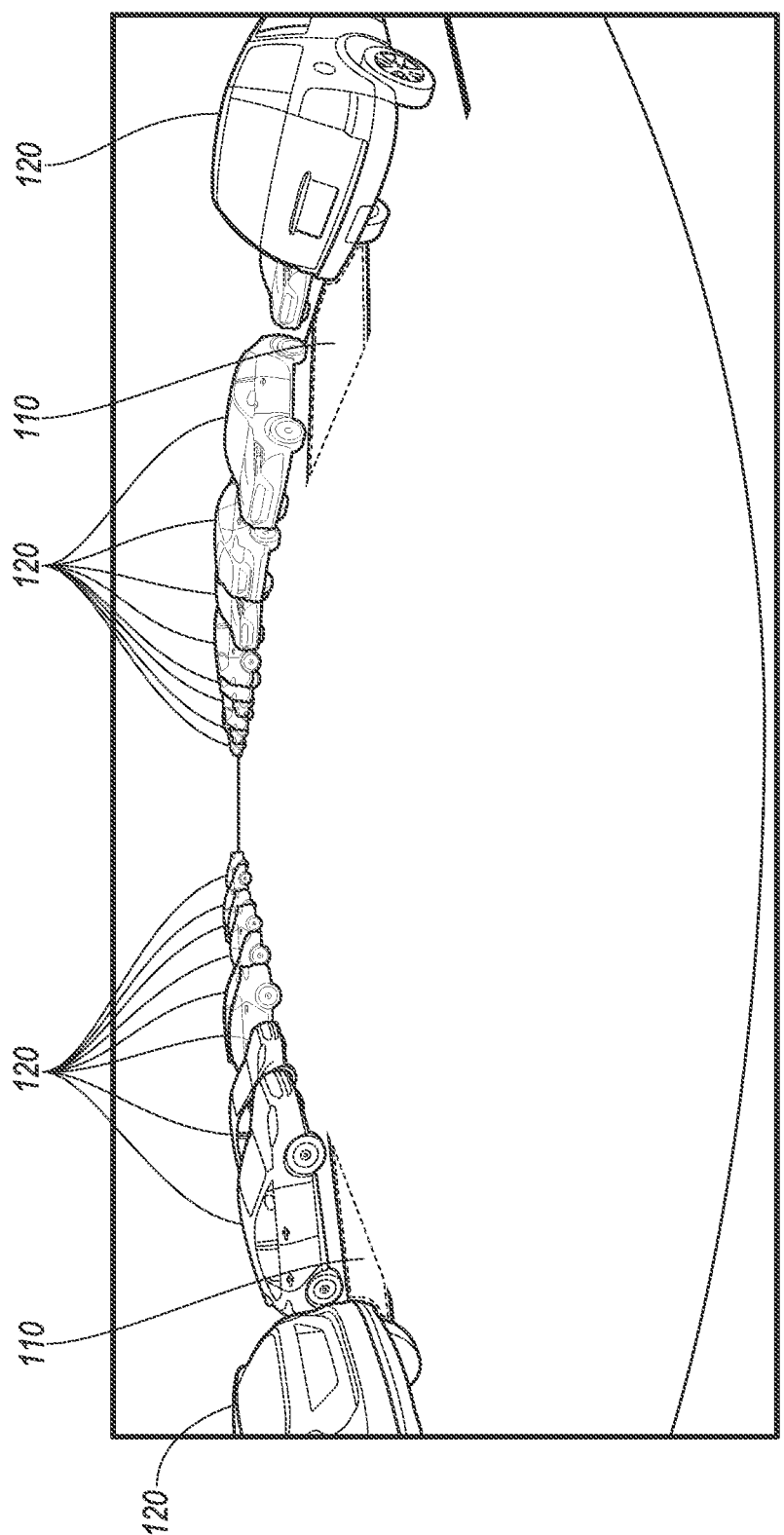
FIG. 6 is an example image from a camera of the vehicle of the parking area.

Next, at a decision block 310, the computer 42 identifies a potentially available parking space 110 in the direction of travel F of the vehicle 30, i.e., forward of the vehicle 30, as shown in FIG. 5A, based on the image data received from the cameras 44, as shown in FIG. 6. For example, the computer 42 can apply criteria for shape and pixel area to regions of the image data. The regions of the image data are sets of adjacent pixels belonging to the same object, e.g., the ground, another vehicle 120, etc., which can be determined by, e.g., using differences in color to infer boundaries between objects. The criterion for shape can be matching a trapezoidal shape generally corresponding to the visible back portion of a parking space 110 when the front portion of the parking space 110 is occluded by another vehicle 30, as appearing in image data. The criterion for pixel area is measured in number or proportion of pixels that the region occupies in the image frame. The criterion for pixel area can vary based on the distance from the camera 44 to the part of the environment that the region represents, which can be inferred from the position of the region in the image frame. The number of pixels for the criterion is chosen to correspond to the number of pixels that a partially occluded parking space 110 would occupy at the inferred distance, as determined experimentally based on sample images of available parking spaces 110 taken from a point of view that the vehicle 30 would occupy while searching for a parking space 110. If both criteria are satisfied, the computer 42 infers that the region represents a potentially available parking space 110, and if either criterion is not satisfied, then the computer 42 infers that the parking space 110 is unavailable. If the computer 42 has not identified a potentially available parking space 110, the process 300 returns to the block 305 to continue traveling through the parking lot 100. If the computer 42 has identified a potentially available parking space 110, the process 300 proceeds to a decision block 315.

In the decision block 315, the computer 42 selects whether to move the vehicle 30 forward into the parking space 110 or backward into the parking space 110. If the parking lot 100 has a regulation requiring that vehicles 30, 120 pull in forward or backward into parking spaces 110 (e.g., to make license plates visible), then the computer 42 selects forward or backward to follow the regulation. The regulation can be stored in the memory of the computer 42 along with map data about the parking, or an infrastructure component associated with the parking lot 100 can transmit the regulation to the vehicle 30. If there is no regulation for the parking lot 100, the computer 42 can select pulling in forward or moving in backward based on a selection by an operator of the vehicle 30, e.g., an occupant. The computer 42 can prompt the user to make a selection upon identifying the potentially available parking space 110, or the selection can be a preference stored in the memory of the computer 42 ahead of time. Alternatively or in the absence of a selection by an operator, the computer 42 can select pulling in forward or moving in backward based on whether a second vehicle 120 is behind the vehicle 30. Upon determining that a second vehicle 120 is behind the vehicle 30, the computer 42 selects forward. Upon determining that no vehicles 120 are behind the vehicle 30, the computer 42 selects backward. If the computer 42 selects backward, the process 300 proceeds to a block 320. If the computer 42 selects forward, the process 300 proceeds to a block 350.

In the block 320, the computer 42 reduces a speed of the vehicle 30 from the travel speed to the scanning speed, which is less than the travel speed. The scanning speed is chosen to allow the proximity sensors 46 sufficient time to determine whether any objects are in the parking space 110 while traveling past the parking space 110. The computer 42 actuates movement of the vehicle 30, e.g., by instructing the propulsion 34, the braking system 36, and the steering system 38, forward at least partially past the parking space 110 to the stop position $P_s$ at the scanning speed, as shown in FIG. 5C. The stop position $P_s$ is a preset distance forward of the parking space 110 and a preset distance laterally from the parking space 110, relative to the vehicle 30. The distances are stored in the memory of the computer 42. The preset distances are chosen to be the shortest possible distances that still permitting the vehicle 30 to travel in reverse to the parking position $P_p$, based on a turning radius of the vehicle 30 while traveling in reverse As the vehicle 30 moves to the stop position $P_s$, the computer 42 receives data from the sensors 40, including from the proximity sensors 46 mounted on the side of the vehicle 30 facing toward the potentially available parking space 110 and from the cameras 44 facing sideways toward the parking space 110. While the vehicle 30 moves past the parking space 110, the proximity sensors 46 and cameras 44 on one side of the vehicle 30 have views of the parking space 110 that are not occluded by other vehicles 120.

Figure 7:
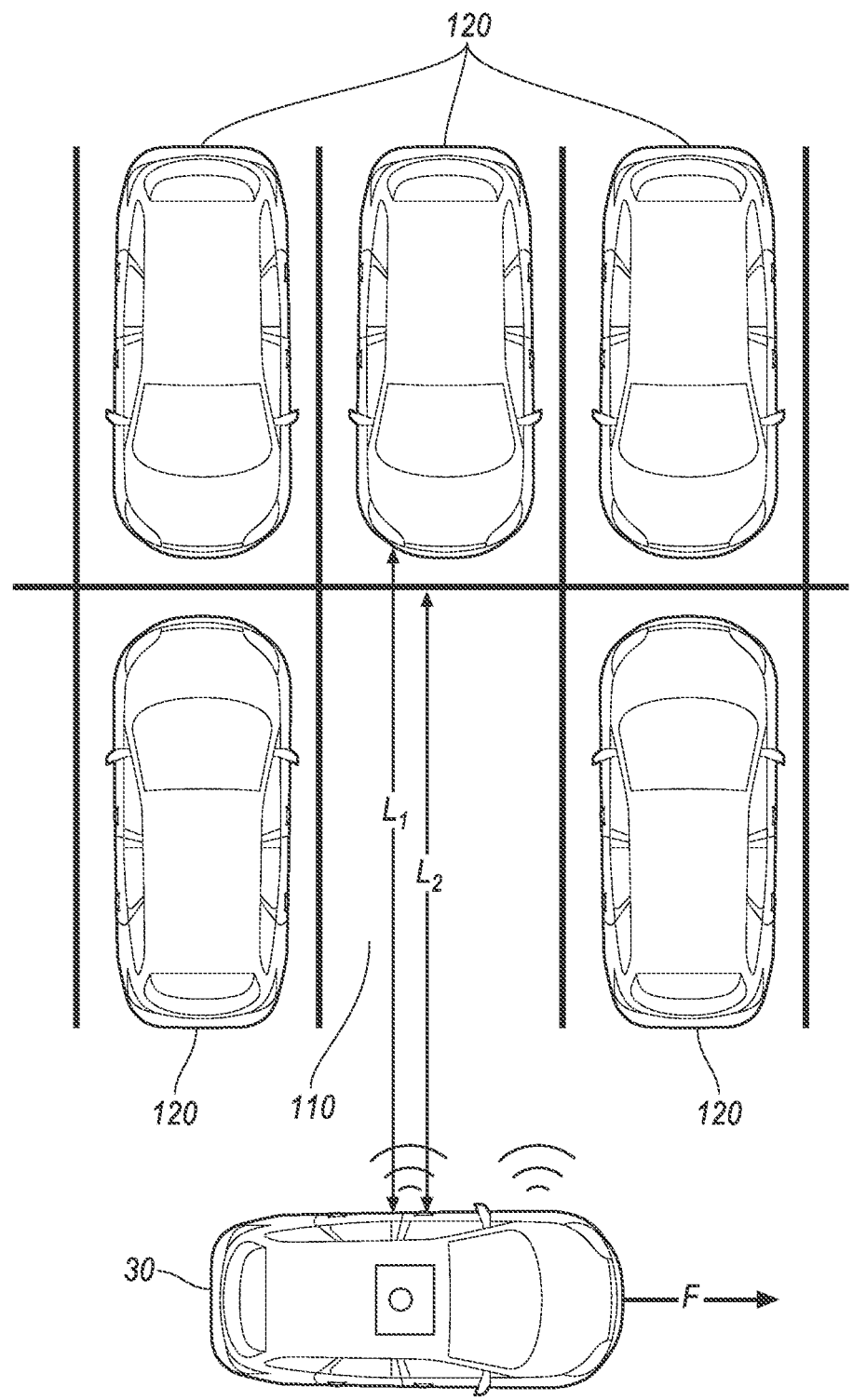
FIG. 7 is a diagram of the vehicle using proximity sensors on an available parking space.

Next, in a decision block 325, the computer 42 determines whether the parking space 110 is available based on the data from the proximity sensors 46 and the cameras 44. The computer 42 determines whether the parking space 110 is free of obstacles based on the data from the proximity sensors 46 by determining whether the distances recorded through the parking space 110 by the proximity sensors 46 are at least as great as a distance from the vehicle 30 to the opposite edge of the parking space 110. For example, as shown in FIG. 7, the distance $L_1$ from the vehicle 30 to a second vehicle 120 past the parking space 110 is greater than a distance $L_2$ from the vehicle 30 to the opposite edge of the parking space 110. Examples of obstacles that would have been occluded from the forward-facing cameras 44 but can be detected by the proximity sensors 46 include motorcycles, shopping carts, small cars, etc. The computer 42 also determines whether the parking space 110 is free of markings indicating that parking is prohibited based on the data from the cameras 44. The computer 42 uses object recognition algorithms to determine whether any markings match known markings that prohibit parking, e.g., parallel, evenly spaced diagonal lines; the International Symbol of Access, i.e., the stylized image of a person in a wheelchair (unless the vehicle 30 contains an occupant who is handicapped); etc. If the parking space 110 is free of obstacles and free of prohibitory markings, then the computer 42 concludes that the parking space 110 is available. If the parking space 110 contains either obstacles or prohibitory markings, then the computer 42 concludes that the parking space 110 is unavailable. If the parking space 110 is unavailable, the process 300 returns to the block 305 to resume moving the vehicle 30 forward at the travel speed along the search path A, even if the vehicle 30 has not yet reached the stop position $P_s$. If the parking space 110 is available, the process 300 proceeds to a block 330.

In the block 330, the computer 42 moves the vehicle 30 forward past the parking space 110 and decelerates toward a stop at the stop position $P_s$.

Next, in a decision block 335, the computer 42 determines whether the vehicle 30 is at the stop position $P_s$. If the vehicle 30 is not yet at the stop position $P_s$, the process 300 returns to the decision block 325 to continue moving past the parking space 110 while receiving data from the sensors 40 about whether the parking space 110 is available. If the vehicle 30 has reached the stop position $P_s$, the process 300 proceeds to a block 340.

Figure 5B:
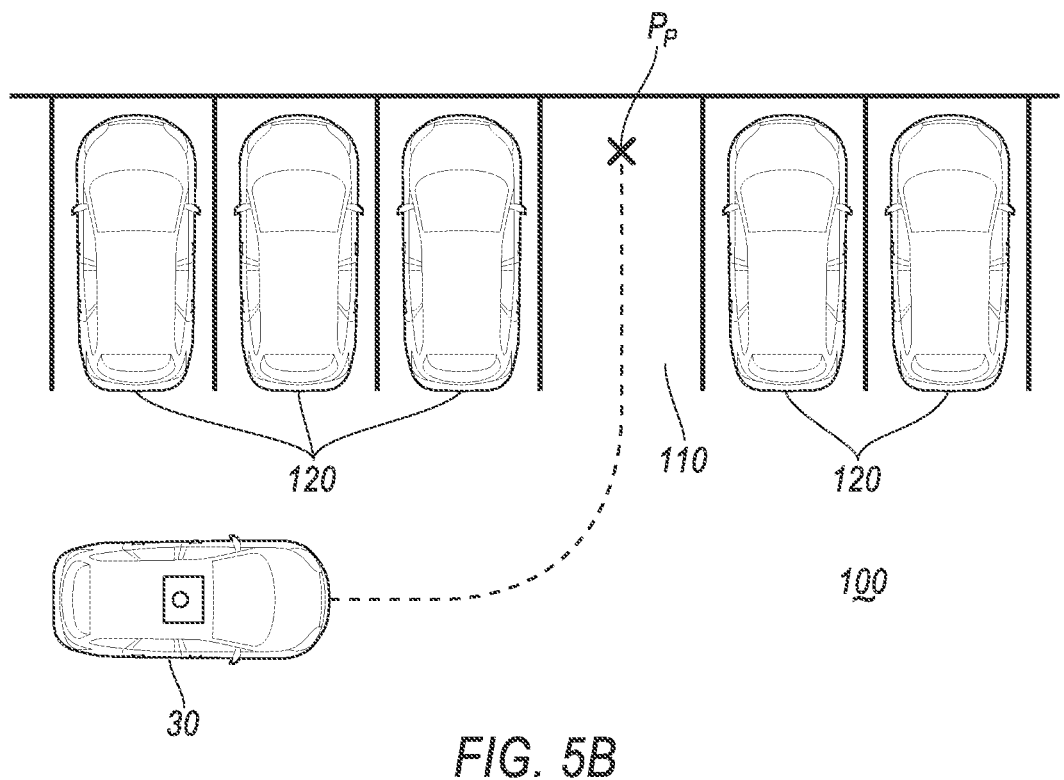
FIG. 5B is a diagram of the vehicle pulling into the available parking space.
Figure 5C:
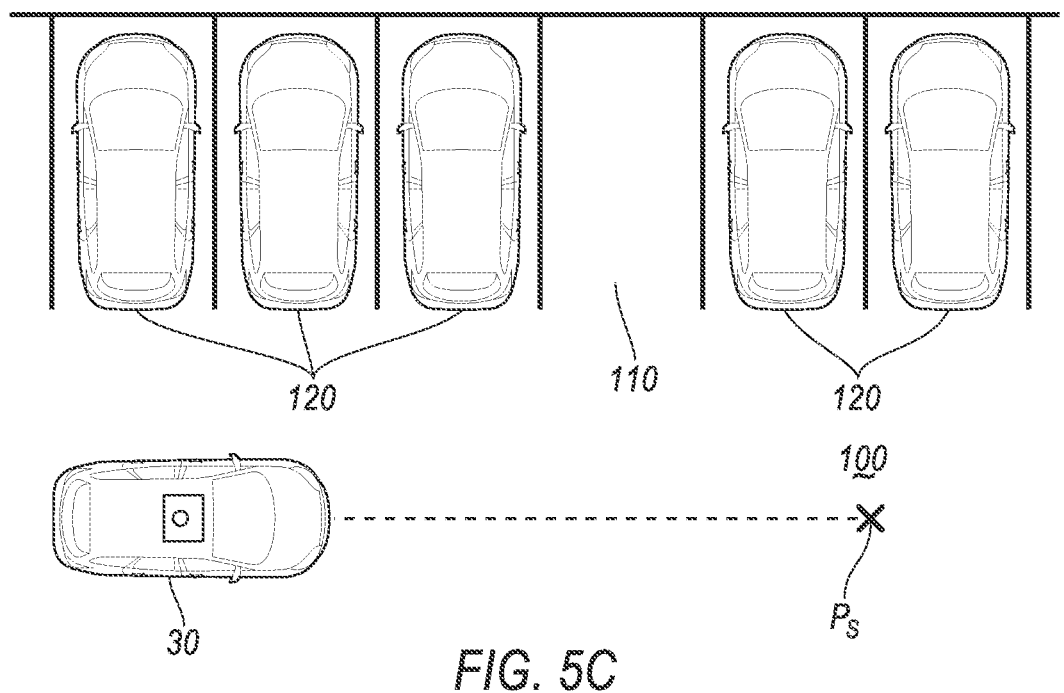
FIG. 5C is a diagram of the vehicle moving past the parking space to a stop position.
Figure 5D:
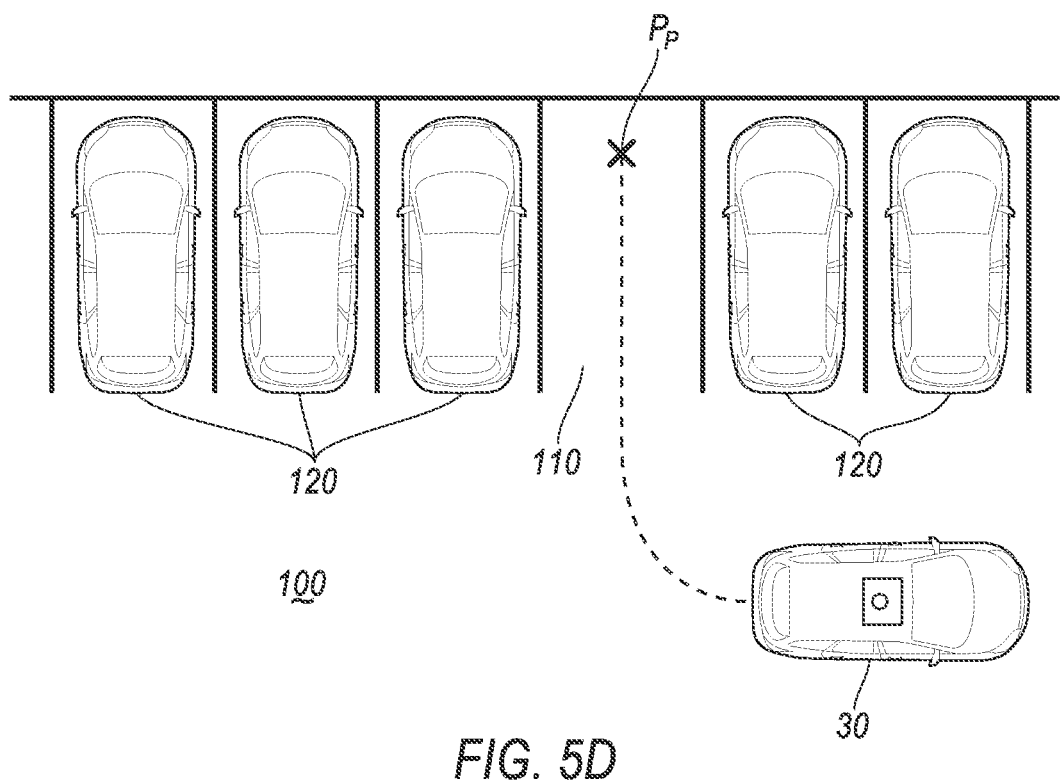
FIG. 5D is a diagram of the vehicle backing into the available parking space from the stop position.

In the block 340, the computer 42 actuates movement of the vehicle 30 backward, i.e., in reverse, from the stop position $P_s$ to the parking position $P_p$, as shown in FIG. 5D. The parking position $P_p$ is a position at which the vehicle 30 is fully parked in the parking space 110, e.g., approximately centered laterally and longitudinally relative to the parking space 110.

Next, in a block 345, the computer 42 turns off the vehicle 30 upon reaching the parking position $P_p$. After the block 345, the process 300 ends.

In the block 350, the computer 42 reduces a speed of the vehicle 30 from the travel speed to the pull-in speed, which is less than the travel speed. The pull-in speed is chosen to allow the proximity sensors 46 sufficient time to determine whether any objects are in the parking space 110 while pulling into the parking space 110. The sufficient time can be determined according to empirical testing of a time for sensors to detect objects and a vehicle 30 to respond, for example.

Next, in a block 355, the computer 42 actuates movement of the vehicle 30, e.g., by instructing the propulsion 34, the braking system 36, and the steering system 38 to move the vehicle 30 forward while turning toward the parking position $P_p$ in the parking space 110, as shown in FIG. 5B. As the vehicle 30 moves to the parking position $P_p$, the computer 42 receives data from the sensors 40, including from the proximity sensors 46 mounted to the front and side of the vehicle 30 and from the cameras 44 facing forward and sideways toward the parking space 110. As the vehicle 30 moves into the parking space 110, the proximity sensors 46 and cameras 44 have a view of the parking space 110 that becomes less occluded and eventually not occluded by other vehicles 120.

Next, in a decision block 360, the computer 42 determines whether the parking space 110 is available based on the data from the proximity sensors 46 and the cameras 44, as described above with respect to the decision block 325. The computer 42 is able to make the availability determination because the vehicle 30 has moved such that the view of the parking space 110 by the proximity sensors 46 and the cameras 44 has become no longer occluded. If the parking space 110 is available, the process 300 proceeds to a decision block 365. If the parking space 110 is unavailable, the process 300 proceeds to a block 370.

In the decision block 365, the computer 42 determines whether the vehicle 30 is at the parking position $P_p$, e.g., based on location data such as GPS data and/or based on the position of markings indicating the parking space 110 relative to the vehicle 30. If the vehicle 30 is not yet at the parking position $P_p$, the process 300 returns to the block 355 to continue moving forward toward the parking position $P_p$. If the vehicle 30 is at the parking position $P_p$, the computer 42 stops movement of the vehicle 30, and the process 300 proceeds to the block 345, in which the vehicle 30 turns off and the process 300 then ends.

In the block 370, which may follow the decision block 360, the computer 42 stops movement of the vehicle 30 short of the parking position $P_p$, i.e., before reaching the parking position $P_p$. The computer 42 actuates movement of the vehicle 30 backward out of the parking space 110 along a retreat path until the vehicle 30 is back on the search path A. The retreat path can be chosen to be a reverse of the path that the vehicle 30 followed to pull into the parking space 110, as shown in FIG. 5B. After the block 370, the process 300 returns to the block 305 to resume moving the vehicle 30 forward at the travel speed along the search path A.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. Terms such as "front," "forward," "back," "rearward," "backward," "left," "right," "lateral," etc., are understood relative to the vehicle. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   actuate movement of a vehicle at a first speed;
   identify a potentially available parking space in a vehicle direction of travel based on first data received from at least one camera having a partially occluded view of the potentially available parking space by determining that criteria are satisfied by a region of an image frame received from the at least one camera, the criteria including that a pixel area occupied by the region within the image frame from the camera fits a size criterion, the criteria including that the shape of the region of the image frame received from the at least one camera is a trapezoidally shaped unoccluded portion of the parking space;
   in response to determining that the criteria for identifying the potentially available parking space are satisfied, reduce a speed of the vehicle to a second speed that is less than the first speed while receiving second data from at least one proximity sensor having an unoccluded view of the parking space;
   in response to determining that the criteria for identifying the potentially available parking space are not satisfied, actuate movement of the vehicle at the first speed; and
   actuate movement of the vehicle to a parking position in the parking space upon determining that the parking space is available based on the second data from the at least one proximity sensor.

2. The computer of claim 1, wherein the at least one proximity sensor includes a plurality of radar or ultrasonic sensors mounted below a beltline of the vehicle.

3. The computer of claim 2, wherein determining that the parking space is available includes determining that the parking space is free of obstacles based on the second data from the radar or ultrasonic sensors.

4. The computer of claim 1, wherein determining that the parking space is available further includes determining that the parking space is free of markings indicating that parking is prohibited based on third data from the at least one camera mounted to the vehicle.

5. The computer of claim 1, wherein the instructions further include to select one of actuating movement of the vehicle forward into the parking space or actuating movement of the vehicle backward into the parking space based on a regulation applying to a parking area including the parking space.

6. The computer of claim 1, wherein the instructions further include to select one of actuating movement of the vehicle forward into the parking space or actuating movement of the vehicle backward into the parking space based on a selection by an operator of the vehicle.

7. The computer of claim 1, wherein the instructions further include to:
   actuate movement of the vehicle forward at least partially past the parking space to a stop position at the second speed while receiving the second data from the at least one proximity sensor about the parking space; and
   actuate movement of the vehicle backward from the stop position to the parking position upon determining that the parking space is available based on the second data from the at least one proximity sensor.

8. The computer of claim 7, wherein the instructions further include to resume actuating movement of the vehicle forward at the first speed before reaching the stop position upon determining that the parking space is unavailable based on the second data from the at least one proximity sensor.

9. The computer of claim 1, wherein the instructions further include to:
   actuate movement of the vehicle forward into the parking space at the second speed while receiving the second data from the at least one proximity sensor about the parking space; and
   stop movement of the vehicle at the parking position upon determining that the parking space is available based on the second data from the at least one proximity sensor.

10. The computer of claim 9, wherein the instructions further include to:
    stop movement of the vehicle short of the parking position upon detecting an obstacle in the parking space or upon detecting markings indicating that parking is prohibited; and
    then actuate movement of the vehicle backward out of the parking space.

11. The computer of claim 1, wherein the instructions further include to turn off the vehicle upon reaching the parking position.

12. The computer of claim 1, wherein identifying the potentially available parking space includes determining that the potentially available parking space is free of vehicles, and determining that the parking space is available includes determining that the parking space is free of nonvehicle obstacles.

13. The computer of claim 1, wherein identifying the potentially available parking space is performed without using the second data from the at least one proximity sensor, and determining that the parking space is available is performed without using the first data from the at least one camera.

14. A vehicle comprising:
a vehicle body;
a propulsion attached to the vehicle body;
a braking system attached to the vehicle body;
a steering system attached to the vehicle body;
at least one proximity sensor mounted to the vehicle body; and
a computer communicatively coupled to the propulsion, the braking system, the steering system, and the at least one proximity sensor;
wherein the computer is programmed to:
  instruct the propulsion to move the vehicle at a first speed;
  identify a potentially available parking space in a vehicle direction of travel based on first data received from at least one camera having a partially occluded view of the potentially available parking space by determining that criteria are satisfied by a region of an image frame received from the at least one camera, the criteria including that a pixel area occupied by the region within the image frame from the camera fits a size criterion, the criteria including that the shape of the region of the image frame received from the at least one camera is a trapezoidally shaped unoccluded portion of the parking space;
  in response to determining that the criteria for identifying the potentially available parking space are satisfied, instruct at least one of the propulsion or the braking system to reduce a speed of the vehicle to a second speed that is less than the first speed while receiving second data from the at least one proximity sensor having an unoccluded view of the parking space;
  in response to determining that the criteria for identifying the potentially available parking space are not satisfied, instruct the propulsion to move the vehicle at the first speed; and
  instruct at least one of the propulsion, the braking system, or the steering system to move the vehicle to a parking position in the parking space upon determining that the parking space is available based on the second data from the at least one proximity sensor.

15. The vehicle of claim 14, further comprising the at least one camera mounted to the vehicle body facing forward and communicatively coupled to the computer.

16. The vehicle of claim 14, wherein the at least one proximity sensor includes a plurality of radar or ultrasonic sensors mounted below a beltline of the vehicle body.

17. The vehicle of claim 16, wherein at least one of the plurality of radar or ultrasonic sensors is directed sideways.

* * * * *